Patented Dec. 25, 1945

2,391,387

UNITED STATES PATENT OFFICE 2,391,387

PROCESS OF MAKING ADHESIVE MATERIAL

Lawrence Bradshaw, Bainbridge, N. Y., and Charles Logan Stachel, Detroit, Mich., assignors to The Borden Company, New York, N. Y., a corporation of New Jersey No Drawing. Application October 12, 1942, Serial No. 461,780

6 Claims. (Cl. 260—112)

For a long time, soluble dried blood (also often called "soluble blood albumen"), has been used in adhesives, and this material can give good glues. This material is, however, rather expensive, and is not always available.

The water-insoluble varieties of dried blood, notably the grades which are denominated "fertilizer blood" and "feeding blood" are products which are generally substantially cheaper than the soluble dried blood, and these products have not heretofore been regarded by the glue industry as being the equivalent of the soluble dried blood, and such insoluble products cannot be substituted for the former in most glue formulas, with satisfactory results.

The present invention concerns the treatment of these insoluble dried bloods, to render them suitable as glues or as components of glues, and the products thereby produced. In our process we aim to render the material at least partly soluble, without too far-going alteration in the properties, which would detract from some of the useful characteristics, for the purpose of making a glue material suitable for making plywood, laminated paper or paper-like materials. A further object is to so treat the insoluble dried blood, of the type indicated, that it will be converted into a product of which the major part will be soluble in water or in dilute alkali solutions, and which will have some of the properties and utility inherent in the "soluble dried blood," of the prior art. A further object is a product made from "insoluble dried bloods" that will be usable in glues in lieu of "soluble dried blood," even though somewhat different therefrom, in detail. Other objects will be apparent.

For more fully explaining and illustrating the invention, we give the following examples, in which parts are by weight, it being understood that the invention is not restricted to these examples.

Briefly stated, the process of the present invention involves subjecting insoluble dried blood, such as the fertilizer grade or the feeding grade, to treatment with what we may call a solubilizing agent, such as caustic soda, aqua ammonia, urea, or ammonium thiocyanate in the presence of water, such treatment (while in the wet state) being effected either in the cold or with the application of a limited degree of heat, and drying the product so produced. Mixtures of such agents, when compatible, can be used and are included in the invention. Under the term "urea" we include also thiourea, biuret and other equivalents of urea.

We have referred above to a particular group of substances as solubilizing agents for the dried blood. We have also tried, for this purpose, solutions of certain substances other than those mentioned, but they are far less satisfactory. Thus aqueous solutions of sodium carbonate, borax and of trisodium phosphate were tried as solubilizers for dried blood, but they were not satisfactory for the purpose and did not give products which would be satisfactory as plywood glues. Hence it is not merely a question of alkalinity of the solution. Solutions of sodium carbonate, borax and trisodium phosphate are all solvents for casein, and solutions of sodium carbonate and of trisodium phosphate are alkalis, whereas solutions of urea or of ammonium thiocyanate are not substantially alkaline. The drying of liquid products can conveniently be carried out on steam heated rolls, or in a spray drier.

In a modified form of procedure, the insoluble dried blood is mixed with one or more of the solubilizing substances referred to above, moistened with a limited amount of water, and the mixture passed through an extrusion machine, such as a screw press extruder commonly used in the industry of casein plastics, this machine involving the features of kneading under pressure, and forcing the mixture through narrow slits or small holes in a nozzle, with or without heating the material during such operations. The extruded rods or ribbons are then dried, for example in a current of warm air, and the dried maple in a current of warm air, and the dried material then ground to the desired degree of fineness.

In the process of the present invention, the dried blood is preferably used alone (except for such impurities as are likely to be present therein, and except for such reagents as are mentioned below). Thus it is not necessary to add other well known glue-forming substances. This greatly simplifies the process, and adds to the economy of the process.

In the following examples all parts are by weight.

I. TREATMENT OF THE WATER-INSOLUBLE DRIED BLOOD (A) EXTRUSION PROCESS

*Example 1*

100 parts of insoluble fertilizer grade dried blood, ground to about 60 or 80 mesh are moistened with a solution of 10 parts of caustic soda in 30 parts water, at room temperature. This is done in a mixer to insure uniform moistening and to prevent lumping. After mixing for about 15 minutes 10 parts of powdered urea are added and the mixing continued for about 10 minutes. The moist mass may then be fed to a screw press extruding machine immediately or, if a greater solubilizing action is desired, it may be allowed to stand for several hours before kneading and extruding. The extruded material, delivered in the form of slender rods or ribbons, is then dried, preferably on trays in a current of warm air, and after drying it is comminuted. If desired the dry powder may be oiled to prevent dusting, and is then ready for use in glue formulas.

In this example it will be observed that caustic soda and urea are added, but the urea is added after the caustic soda has already acted, to a large extent at least.

Example 2

100 parts of water-insoluble dried blood, e. g. feeding grade, are mixed with a cold or warm solution of 10 parts of caustic soda in 35 parts water. The mixing is continued for about 20 minutes. The moist mass may then be extruded from the type of screw press extruder, or if a more prolonged action of the caustic soda is desired, the mass may be allowed to season for several hours before extruding. The extruded product is dried and treated as in Example 1.

(B) Wet Processes

These involve the use of a larger proportion of water in the initial mix. The mixture, in the form of a thin slurry may be dried on heated rolls (e. g. the drying machines commonly employed for drying milk) or in a spray drier.

Example 3

In a mixing kettle provided with an efficient stirrer place 600 pounds of water at about 60° F. Add 7 pounds of caustic soda. With the mixer running, add 100 pounds of fertilizer blood, slowly, to avoid formation of lumps. Stir for about 15 minutes until a uniform slurry is obtained. The slurry is then allowed to flow on to the heated rolls of a drier of the type commonly used to dry milk. The dry product is scraped off in the form of a fluffy powder which needs no grinding and is ready for use in adhesives. If desired, the powder may be oiled to render it non-dusting.

Example 4

Place 700 pounds of water in a steam jacketed kettle provided with a suitable stirring device. Add 6 pounds of caustic soda. By passing steam into the jacket, raise the temperature of the solution to about 180° F. Then add slowly, with continuous stirring, 100 pounds of feeding grade insoluble dried blood and maintain the temperature at about 180° F. for 5 minutes. The slurry is then ready to feed to the roller drier; or the slurry may be diluted further with about 200 pounds of water and then fed to the spray drier.

Example 5

Place 600 pounds of water at about 60° F. in the kettle. Add 10 pounds of caustic soda. Add slowly 100 pounds of fertilizer blood with agitation to prevent lumping. After the addition is complete, continue stirring for about 30 minutes, then add 300 pounds of water at 60° F., and stir further for about 5 minutes. The mixture is then ready to feed to the spray drier, such as the Bowen type, where the dry product is obtained in the form of a fine powder ready for use.

The above examples are given by way of illustration but it will be understood that they may be modified to suit the available raw material. It should be kept in mind that the commercial grades of dried blood vary widely in quality, some of them being substantially all blood and others containing slaughter house waste such as fleshings, tankage, bone scraps, etc., which impurities do not have to be separated. The products obtained by treating the different grades of raw materials by our processes may likewise show considerable variation according to the material selected.

In the appended claims, we use the term "caustic alkali" to include the hydroxides of the alkali metals and of ammonium. Thus MOH is the generic formula, "M" representing an alkali metal (e. g. Na) or ammonium (i. e. NH4). Such bodies are strong alkalies, readily soluble in water, and well known as solvents for certain proteinaceous substances including casein and certain other water insoluble proteins. They also act upon insoluble dried blood to convert this into a wholly dispersible, partly soluble product.

In general, the solubilizing treatment should not be carried so far as to cause any considerable decomposition of the blood, which would produce an inferior product and would reduce the ultimate adhesive strength of the glue prepared from it. Accordingly, in the above examples, the alkaline solubilizing agents are contacted with the insoluble dried blood at temperatures not substantially above 180° F., and treatments as given in these examples are sufficient to solubilize a part at least (and preferably the major part) of the dried blood treated without a too drastic action on said material, which would substantially reduce the adhesive strength of the glue eventually produced.

It is regarded as surprising that the material can be subjected to a heat-drying process, particularly when caustic soda has been used as the solubilizing agent, without undergoing a far-reaching decomposition or hydrolysis, and consequent loss of adhesive strength.

The comminuted dried product, made as prepared in the above examples, is in large part soluble in water and in mild alkali solutions (e. g. 2–3% NaOH solution).

It will be understood that when the "dried blood" used, is of a grade containing bone fragments, such bone would not be dissolved or rendered soluble by the treatment. The impurities present in dried blood are subject to variation, both in amount and character.

II. UTILIZATION OF THE PRODUCTS OBTAINED BY THE ABOVE PROCESSES A AND B

As examples of the use of these products in glues intended for cold pressing, in plywood manufacture, the following may be given.

Example 6

|  | Parts |
|---|---|
| Dried extruded blood product | 60 |
| Casein | 30 |
| Lime | 10 |
|  | 100 |

The dry ingredients are blended together. 100 parts of the dry mixture are added to 200 parts (by weight) of water at 60° F., and mixed for 15 minutes to smooth out any lumps. The fluid glue is then ready for use. In this example the viscosity of the fluid glue (on the Stoemer viscosimeter provided with a 500 gram weight) was 20. The glue was spread on birch veneers at the rate of 90 pounds liquid glue per thousand square feet of single glue line, which were then assembled into plywood and pressed at room temperature at 150 pounds per square inch for about 12 hours, and then dried at room temperature. When tested according to U. S. Navy Specification 52G8b the dry shear strength of the specimens was 325 pounds per square inch, with 65% failure in the wood, and the wet shear strength was 165 pounds per square inch with 20% failure in the wood.

*Example 7*

|  | Parts |
|---|---|
| Extruded blood product | 24 |
| Casein | 45 |
| Lime | 10 |
| Trisodium phosphate | 2 |
| Sodium fluoride | 3 |
| Cellulose | 10 |
| Starch | 4 |
| Copper sulphate | 1 |

100 parts of this dry glue base are to be mixed with 200 parts of water at about 60° F. The water is placed in a mixing kettle and the powder is added slowly to avoid the formation of lumps. After stirring for 5 minutes the mixer is stopped and the mass allowed to rest for 10 minutes; the mixing is continued for 5 minutes and the liquid glue then has a consistency suitable for spreading and is ready for use. Birch plywood glued with this composition applied and pressed cold, had a dry shear strength of 445—40 and a wet shear strength of 170—0.

Examples illustrating the use of the treated blood products in hot-press formulas are as follows:

*Example 8*

|  | Parts |
|---|---|
| Roller dried product | 47 |
| Casein | 30 |
| Cellulose | 10 |
| Lime | 7 |
| Trisodium phosphate | 3 |
| Sodium fluoride | 3 |
|  | 100 |

After thoroughly blending the dry ingredients, one part of this glue base was mixed with 4 parts of water at about 60° F. The liquid glue thus obtained was spread on 1/32" birch veneers at the rate of 35 pounds per thousand square feet of glue line, which were then assembled in the usual manner and pressed in a hot press for 4 minutes at a temperature of 240° F., and pressure of 175 pounds per square inch. After seasoning for five days the plywood had a dry shear strength of 355 with 15% wood failure, and a wet shear strength of 220 pounds with 15% wood failure, after soaking in water for 48 hours.

*Example 9*

|  | Parts |
|---|---|
| Extruded blood product | 56 |
| Commercial water-soluble dried blood | 19 |
| Cellulose | 20 |
| Lime | 5 |
|  | 100 |

The dry ingredients are blended together. 100 pounds of this glue base are added to 300 pounds of water at 60° F., and stirred for 10 minutes. Then add 75 pounds of sodium silicate and 50 pounds of water and continue mixing for 5 minutes. The liquid glue is then ready for use. In this example the viscosity (Stoermer) was 34. Spread on 1/32" birch veneer at the rate of 60 pounds per thousand square feet single glue line. Pressed in the hot press using a pressure of 175 pounds at 240° F., for 4 minutes. Dry shear strength 340 pounds per square inch, with about 10% wood failure. The wet shear strength (after soaking for 48 hours) was 190 pounds per square inch, without wood failure.

We claim:

1. A process of treating insoluble dried blood selected from the group consisting of fertilizer blood and feeding blood, which comprises mixing such insoluble blood with a caustic alkali, and water in an amount sufficient to dissolve such caustic alkali, such treatment being conducted at a temperature not substantially above 180° F., and drying the mixture, the proportion of caustic alkali and the amount of any heating being sufficient to cause the conversion of the major part of said insoluble dried blood into the soluble condition.

2. A process of treating insoluble dried blood selected from the group consisting of fertilizer blood and feeding blood, which comprises moistening such dried blood with a solution of a caustic alkali, containing about 6 to 10 parts of caustic alkali, figured as caustic soda, to 100 parts of said dried blood, kneading such material under pressure, extruding such moistened material through a narrow outlet, all without heating said mixture of materials to substantially above 180° F., and drying the whole of the extruded product.

3. A process which comprises mixing insoluble dried blood selected from the group consisting of fertilizer blood and feeding blood, with caustic soda as a solubilizing agent, and water in amount sufficient to dissolve said solubilizing agent, the amount of said solubilizing agent and any heat employed being together sufficient to effect solubilization of a major fraction of said dried blood, all without heating the mixture to above 180° F., and thereafter drying said mixture, and comminuting said dried product.

4. In the treatment of insoluble dried blood selected from the group consisting of the fertilizer blood and feeding blood, the process which comprises moistening such material with a solution of an alkaline hydroxide, the amount of such hydroxide being not considerably less than 10%, based on the weight of said dried blood, and the amount of water being sufficient to dissolve said alkaline hydroxide but not substantially over 35%, based on the amount of said dried blood, forcing said moistened material through an extrusion press, and drying the extruded mass.

5. A process of treating insoluble dried blood selected from the class consisting of fertilizer blood and feeding blood which comprises mixing said dried blood with water and an alkaline hydroxide, in the proportions of 100 parts of said dried blood, about 30 to about 900 parts of water and about 6 to 10 parts of alkaline hydroxide, calculated as sodium hydroxide, and without heating to substantially above 180° F., and without washing out water solubles, and without neutralizing the alkali, and without filtration, drying such mixture.

6. A process of treating dried blood of the class consisting of fertilizer blood and feeding blood, which comprises mixing 100 parts of said dried blood with several times its weight of water and with an alkaline hydroxide equivalent to about 6 to about 10 parts of sodium hydroxide, stirring for a time at a temperature not substantially above 180° F., and drying the whole mixture.

LAWRENCE BRADSHAW.
CHARLES L. STACHEL.